United States Patent Office 3,808,255
Patented Apr. 30, 1974

3,808,255
STYRYL DYESTUFFS
Hans Rudolf Schweizer, Reinach, Basel-Land, Switzerland, and Werner Weiskat, Loerrach, Germany, assignors to Ciba-Geigy AG, Basel, Switzerland
No Drawing. Filed Sept. 24, 1971, Ser. No. 183,681
Claims priority, application Switzerland, Sept. 30, 1970,
14,664/70
Int. Cl. C07c 121/70
U.S. Cl. 260—465 D                3 Claims

ABSTRACT OF THE DISCLOSURE

A mixture of two styryl dyestuffs which are sparingly soluble in water and are free of groups which dissociate in water to give an acid reaction and confer solubility in water, of the Formula I

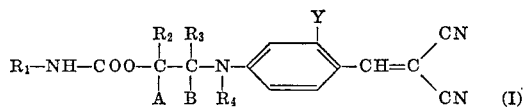

in which one of A and B denotes hydrogen and the other denotes an optionally substituted phenyl radical, $R_1$ denotes an alkyl radical of 1–8 carbon atoms, a cycloalkyl radical, an optionally substituted aryl radical or a heterocyclic structure, $R_2$ and $R_3$ independently of one another denote hydrogen or the methyl group, $R_4$ denotes an optionally substituted lower alkyl group and Y denotes hydrogen, halogen or a lower alkyl group.

---

The present invention relates to new styryl dyestuffs which are sparingly soluble in water and can be used as dispersion dyestuffs, processes for their manufacture, the use of the new styryl dyestuffs for dyeing hydrophobic organic fibre material, especially for dyeing textile fibres of linear polyesters of aromatic polycarboxylic acids with polyhydric alcohols or of cellulose esters and, as an industrial product, the fibre material dyed with the new dyestuffs.

Valuable styryl dyestuffs having very good fastness to sublimation and stability to boiling-down have been discovered, which are free of groups which dissociate in water to give an acid reaction and confer solubility in water, and which correspond to the following Formula I

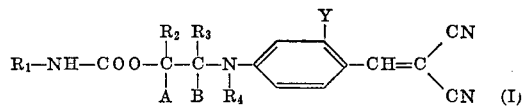

in which one of A and B denotes hydrogen and the other denotes an optionally substituted phenyl radical, $R_1$ denotes an alkyl radical of 1–8 carbon atoms, a cycloalkyl radical, an optionally substituted aryl radical or a heterocyclic structure, $R_2$ and $R_3$ independently of one another denote hydrogen or the methyl group, $R_4$ denotes an optionally substituted lower alkyl group and Y denotes hydrogen, halogen or a lower alkyl group.

The term "groups which dissociate in water to give an acid reaction and confer solubility in water," these groups being excluded in the new dyestuffs, is used here and in the following text to refer to the known substitutents which impart anionic character to the dyestuffs, for example sulphonic acid, carboxylic acid or phosphonic acid groups.

Possible substitutents of the phenyl radical A or B are preferably lower alkyl groups, especially the methyl group, lower alkoxy groups or halogens, such as fluorine, chlorine or bromine.

If $R_1$ in the Formula I denotes a lower alkyl radical, this radical advantageously has 1 to 4 carbon atoms.

If $R_1$ represents a cycloalkyl radical, cycloalkyl groups with 5-membered or 6-membered rings, and especially the cyclohexyl group, are preferably used.

If $R_1$ denotes an aryl radical, this radical for example belongs to the naphthalene series or preferably to the benzene series; it can contain customary non-ionic ring substitutents. The nitro, nitrile, lower alkyl or lower alkoxy groups or halogens, such as fluorine, chlorine or bromine may be mentioned as examples of such substituents, especially of the phenyl radical.

In preferred styryl dyestuffs of the Formula I, $R_1$ denotes the phenyl radical and $R_2$ and $R_3$ are both preferably hydrogen.

The lower alkyl group $R_4$ advantageously possesses 1 to 4 carbon atoms and for example represents the methyl, ethyl, n-propyl, isopropyl, n-butyl or iso-butyl group. If the alkyl group $R_4$ is substituted, possible substituents are, for example, halogens, such as chlorine or bromine, lower alkoxy groups or lower alkoxycarbonyl groups. Preferably, the lower alkyl group $R_4$ is unsubstituted.

If Y denotes a lower alkyl group, it advantageously possesses 1 or 2 carbon atoms. If Y represents halogen, it is especially bromine and above all chlorine. Preferably Y denotes the methyl group.

The expression "lower" before the term "alkyl," "alkoxy" or "alkoxycarbonyl" denotes that the group possesses at the most 5 carbon atoms.

The new styryl dyestuffs of the Formula I are obtained by reacting an aldehyde compound of the Formula II

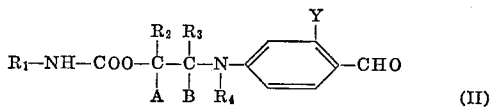

in which A, B, $R_1$, $R_2$, $R_3$, $R_4$ and Y have the meaning indicated under Formula I, with malonic acid dinitrile, the starting substances of the Formula II being so chosen that the resulting dyestuff is free of groups which dissociate in water to give an acid reaction and confer solubility in water.

The reaction is appropriately carried out in an aprotic or protic organic solvent and preferably in the presence of a basic catalyst. Suitable solvents are, for example, optionally halogenated or nitrated aromatic hydrocarbons, for example toluene, xylenes, halogenobenzenes or nitrobenzenes, optionally halogenated aliphatic hydrocarbons, for example chloroform, trichloroethylene, tetrachloroethylene, tetrachloroethane or trichloroethane, or organic solvents which are miscible with water, especially aliphatic or cycloaliphatic ketones, such as acetone, methyl ethyl ketone or methyl isobutyl ketone or cyclohexanone, alkanols, such as methanol, ethanol, isopropanol, butanols or amyl alcohols, and also dioxane, dimethylsulphoxide, tetrahydrofurane, methylpyrrolidone and dimethylformamide. The condensation can also be carried out in a finely divided, aqueous suspension of the reactants. Suitable basic catalysts are above all small amounts of secondary aliphatic or cyclic amines such as dimethylamine, diethylamine, piperidine or morpholine, or their salts with weak organic acids, such as acetic acid.

The starting substances of the Formula II can be manufactured according to processes which are in themselves known, for example according to a method of A. Vilsmeier and A. Haack [compare Berichte der Deutschen Chemischen Gesellschaft, volume 69, 119 (1927)] by reaction of a tertiary amine of the Formula III

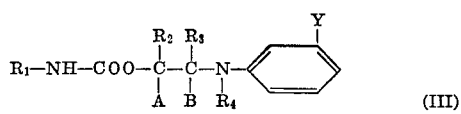

in which A, B, $R_1$, $R_2$, $R_3$, $R_4$ and Y have the meaning indicated under Formula I, with N-methylformanilide or N,N-dimethylformamide and an inorganic acid chloride, especially phosphoric acid oxychloride.

The amines of the Formula III are appropriately manufactured by reaction of a hydroxyaralkylamine of the Formula IV

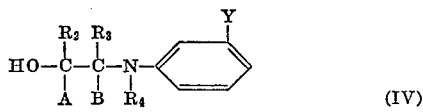

in which A, B, $R_2$ $R_3$, $R_4$ and Y have the meaning indicated under the Formula I, with an isocyanate of the Formula V $$R_1\text{—N=C=O} \qquad (V)$$

in which $R_1$ has the meaning indicated under Formula I.

Suitable isocyanates are, for example, the alkylisocyanates and arylisocyanates as well as heterocyclic isocyanates, such as, for example, methylisocyanate,
ethylisocyanate,
n-propylisocyanate,
n-butylisocyanate,
octylisocyanate,
methylisocyanatoacetate,
butyl-isocyanatoacetate,
cyclohexylisocyanate,
phenylisocyanate, p-tolylisocyanate,
o-, m- and p-chlorophenylisocyanate,
m- and p-nitrophenylisocyanate,
2,5-dichlorophenylisocyanate,
o- and p-methoxyisocyanate,
2-naphthylisocyanate,
2-biphenylisocyanate,
2-isocyanatotetrahydropyrane,
tetrahydrofurfurylisocyanate,
3-isocyanato-pyridine,
2-furylisocyanate,
3-isocyanato-N-ethylcarbazole and isocyanates of heterocyclic compounds containing sulphur, such as 2-carbomethoxy-3-isocyanatothiophene,
2-isocyanato-3-cyano-thiophene,
2-isocyanato-3-carbomethoxy-4-methyl-thiophene,
2-isocyanato-5-methyl-thiophene-3-carboxylic acid amide,
2-isocyanato-3-carbomethoxy-3,4-dimethyl - thiophene, 2-isocyanato-3-carboethoxy-3,4 - tetramethylene - thiophene and 3-isocyanato-sulpholane.

The reaction of the hydroxyaralkylamine of the Formula IV with the isocyanate of the Formula V is carried out in an organic solvent which is free of water, hydroxyl groups and primary and secondary amino groups. To accelerate the reaction, tertiary amines can be added in catalytic amounts. A preferred embodiment is the reaction of the two components in dimethylformamide, which simultaneously acts as a solvent and reaction accelerator and serves as a reactant in the subsequent formylation according to A. Vilsmeier and A. Haack (loc. cit.).

The hydroxyaralkylamines of the Formula IV are obtained by addition of an epoxy compound of the Formula V

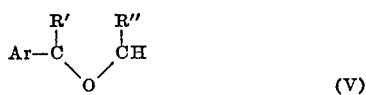

in which Ar denotes an optionally substituted phenyl radical corresponding to the radicals A and B, and R' and R" have the same meaning as $R_2$ and $R_3$, onto an amine of the Formula VI

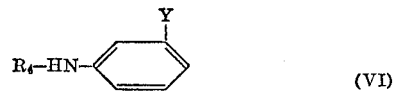

preferably at elevated temperature and optionally in the presence of a lower alkanol, such as methanol, ethanol or isopropanol, or of glacial acetic acid or boron trifluoride-etherate as the catalyst. In the addition, two isomeric compounds of the formulae

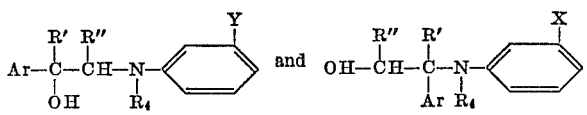

are produced, and these are subsequently symbolized by the above general Formula IV.

Styryl dyestuffs according to the invention, of the Formula I, are yellow to orange powers. They are suitable for dyeing or printing synthetic organic fibre material, for example for dyeing fibre material which consists of linear high molecular esters of aromatic polycarboxylic acids with polyhydric alcohols, such as polyethylene glycol terephthalate or poly-(1,4-cyclohexanedimethylol-terephthalate), and also for dyeing fibre material of cellulose 2-acetate, cellulose 2½-acetate or cellulose triacetate. These dyestuffs can, however, also be used for dyeing synthetic polyamide fibres, such as polyhexamethylene adipamide, polycaprolactam or polyaminoundecanoic acid, as well as for dyeing polyolefines, especially polypropylene fibres. Furthermore, depending on their composition, they are suitable for dyeing or pigmenting lacquers, oils and waxes as well as cellulose derivatives, especially cellulose esters, such as cellulose acetate, cellulose propionate and cellulose acetobutyrate or polystyrene and polyamides in bulk.

For dyeing the said fibre materials, they are preferably employed from aqueous dispersion. It is therefore desirable to finely divide the final substances of the Formula I which can be used as dispersion dyestuffs by grinding them with dispersing agents and possibly with further grinding auxiliaries.

Organic dispersing agents suitable for the purpose are, for example, the alkylarylsulphonates, the condensation products of formaldehyde with naphthalenesulphonic acid and the ligninsulphonates; non-ionic dispersing agents suitable for the purpose are, for example, the fatty alcohol- or alkylphenyl-polyglycol ethers having a higher alkyl radical.

Dyeing of the polyester fibres with the dyestuffs according to the invention which are sparingly soluble in water, from an aqueous dispersion, is carried out in accordance with the processes customary for polyester materials. Polyesters of aroratic polycarboxylic acids with polyhydric alcohols are preferably dyed at temperatures of above 100° C., under pressure. The dyeing can, however, also be carried out at the boiling point of the dyebath, in the presence of dye carriers, for example phenylphenols, polychlorobenzene compounds or similar auxiliaries, or according to the thermosol process, that is to say padding with subsequent hot aftertreatment, for example thermosetting, at 180–210° C. Cellulose 2½-acetate fibres are preferably dyed at temperatures of 80–85° C., whilst cellulose triacetate fibres are advantageously dyed at the boiling point of the dyebath. When dyeing cellulose 2½-acetate fibres or polyamide fibres, the use of dye carriers is superfluous. Styryl dyestuffs according to the invention can, however, also be used for dyeing the said materials from organic solvents, if appropriate in the presence of a solubilizing agent.

The printing of the said textile materials is also carried out in accordance with the customary methods, for example by printing the goods with the printing paste which, in addition to the dyestuff and the dyeing accelerator, also contains thickeners and customary additives, such as, for example, urea, and subsequently fixing the dyestuff by steaming at 100–130° C. for 15 minutes.

Styryl dyestuffs according to the invention, of the Formula I, are absorbed very well on the abovementioned synthetic organic fibre material, especially on polyethylene glycol terephthalate fibres, and give brilliant and pure greenish-tinged yellow dyeings thereon, these dyeings additionally showing good fastness to light, rubbing, washing, perspiration, decatizing and sublimation.

As a result of their excellent cotton and wool reserve behavior in combination with cotton or wool dyestuffs, the new dyestuffs of the Formula I are suitable for dyeing mixed fabrics of polyester fibres and cotton or wool. They can also be used, in combination with dispersion dyestuffs of other colors, for achieving mixed colors on linear polyester fibres and cellulose acetate fibres, since they do not display any "catalytic fading." This property is particularly important in the combination with suitable blue dyestuffs, especially those of the anthraquinone series, with which pure green shades are obtained which have very good fastness to light.

Relative to the nearest comparable dyestuffs, styryl dyestuffs according to the invention surprisingly show substantially better fastness to sublimation and when applied in high temperature processes, that is to say when dyeing from an aqueous dispersion at temperatures of 120–140° C. under pressure, are distinguished by significantly better resistance to boiling down. The effect of the latter is that dyestuffs according to the invention yield strongly colored dyeings over a very broad pH range (pH 3–6) which proves very advantageous in their practical manipulation in dyeing.

EXAMPLE 1

40.2 g. of a mixture of the isomeric aldehydes of the formulae

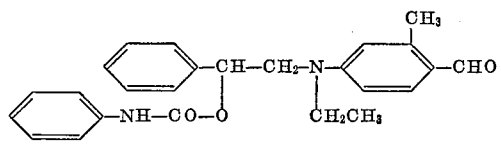

and

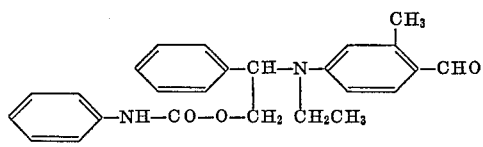

are stirred with 200 ml. of methanol and 7.3 g. of malonic acid dinitrile, 0.9 g. of piperidine and 1.8 g. of glacial acetic acid are added. Thereafter the reaction mixture is heated to the reflux temperature for 2 hours, whilst stirring. After cooling, the dyestuff formed is filtered off, washed with methanol and dried. 35 g. of a dyestuff mixture of melting point 158–160° C. are obtained, the composition of which corresponds to the formulae

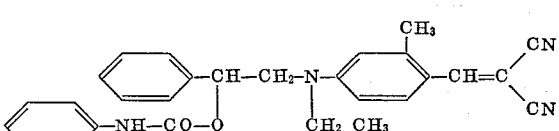

and

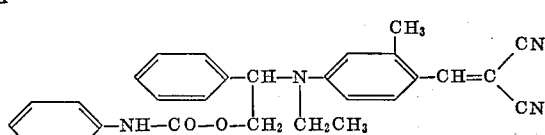

After grinding with a dispersing agent, for example ligninsulphonate, this dyestuff mixture dyes fibres of cellulose diacetate and cellulose triacetate and especially of polyethylene glycol terephthalate from aqueous dispersion in brilliant, greenish-tinged yellow shades. The dyeings have excellent fastness to sublimation, rubbing, washing and light.

The isomer mixture of the aldehydes which serves as the starting material is obtained as follows:

67.5 g. of N-ethyl-m-toluidine and 10 ml. of ethanol are heated to 100° C., 63 g. of styrene oxide are added dropwise whilst stirring, and the temperature is raised to 130° C. over the course of 6–7 hours, after which an isomer mixture of the formulae

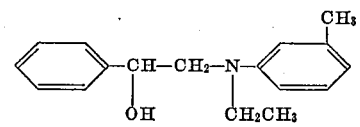

and

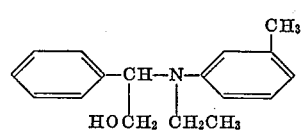

is formed. After removing the ethanol in vacuo, 130 g. of the isomer mixture are obtained as a viscous oil. This oil is treated with 110 g. of N,N-dimethylformamide. Thereafter 65.5 g. of phenylisocyanate are added dropwise and the temperature is allowed to rise to 60° C. The reaction mixture is subsequently left to stand for 3 hours at 55–65° C., and a mixture of the two isomeric compounds of the formulae

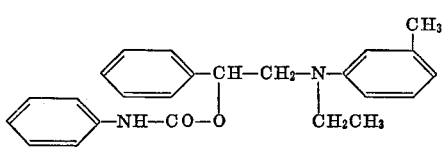

and

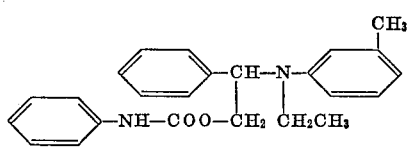

is obtained.

100 g. of phosphoric acid oxychloride are added dropwise at 50° C., and whilst stirring, to the solution of this isomer mixture in dimethylformamide. Thereafter the resulting solution is diluted with 50 ml. of dimethylformamide and stirred for 6 hours at 50° C. 400 ml. of chloroform are then added, the chloroform solution is poured onto ice water, the aqueous phase is adjusted to a pH value of 6–7 with aqueous sodium hydroxide solution and the whole is stirred overnight. After separating off the aqueous phase, the chloroform solution is washed with water and the chloroform is removed in vacuo. 145 g. of the isomer mixture of the aldehydes of the above formulae are obtained as a viscous mass. This mass can be caused to crystallize by dissolving in methanol and prolonged standing in the cold.

Further styryl dyestuffs with similar properties are obtained if, whilst otherwise following the identical procedure, the aldehyde components used in the preceding Example 1 are replaced by equivalent amounts in one of the aldehyde mixtures listed in the table below, column II. The last column gives the color shades of dyeings obtained with the corresponding styryl dyestuffs on polyethylene glycol terephthalate fibres.

TABLE

Aldehyde components of the formulae $$R_1-NH-COO-\underset{Ar}{\underset{|}{C}}-\underset{R_4}{\underset{|}{CH}}-N\underset{}{\underbrace{\phantom{XX}}}\text{-CHO and } R_1-NH-COO-\underset{Ar}{\underset{|}{CH}}-\underset{R_4}{\underset{|}{C}}-N\underset{}{\underbrace{\phantom{XX}}}\text{-CHO}$$

(with R', R'' on the CH/C carbons and Y on the benzaldehyde ring)

| Example No. | R₁ | R' | R'' | Ar | R₄ | Y | Color shade [1] |
|---|---|---|---|---|---|---|---|
| 2 | C₆H₅— | H | H | C₆H₅— | —CH₂CH₂CH₂CH₃ | —CH₃ | Greenish-tinged yellow. |
| 3 | Same as above | CH₃ | H | Same as above | —CH₂CH₃ | —CH₃ | Do. |
| 4 | 4-Cl—C₆H₄— | H | H | ...do... | —CH₂CH₃ | —CH₃ | Do. |
| 5 | Cl—C₆H₄— | H | H | ...do... | —CH₂CH₂CH₂CH₃ | —CH₃ | Do. |
| 6 | CH₃—C₆H₄— | H | H | ...do... | —CH₂CH₂CH₂CH₃ | —CH₃ | Do. |
| 7 | 3-CH₃—C₆H₄— | H | H | C₆H₅— | —CH₂CH₃ | —CH₃ | Do. |
| 8 | C₆H₅— | H | H | Same as above | —CH₂CH₂CH₂CH₃ | —H | Do. |
| 9 | Same as above | H | CH₃ | ...do... | —CH₂CH₃ | —CH₃ | Do. |
| 10 | ...do... | CH₃ | CH₃ | ...do... | —CH₂CH₃ | —CH₃ | Do. |
| 11 | ...do... | H | H | CH₃—C₆H₄— | —CH₂CH₃ | —CH₃ | Do. |
| 12 | ...do... | H | H | Cl—C₆H₄— | —CH₂CH₃ | —CH₃ | Do. |
| 13 | ...do... | H | H | Same as above | —CH₂CH₂CH₂CH₃ | —CH₃ | Do. |
| 14 | ...do... | H | H | C₆H₅— | —CH₂CH₂CH₂CH₃ | —Cl | Do. |
| 15 | ...do... | H | H | Same as above | —CH₂CH₂CH₃ | —CH₃ | Do. |
| 16 | ...do... | H | H | ...do... | —CH₃ | —CH₂CH₃ | Do. |
| 17 | CH₃— | H | H | ...do... | —CH₂CH₃ | —CH₃ | Do. |
| 18 | CH₃—(CH₂)₃— | H | H | ...do... | —CH₂CH₃ | —CH₃ | Do. |
| 19 | C₆H₁₁— (cyclohexyl) | H | H | ...do... | —CH₂CH₃ | —CH₃ | Do. |
| 20 | 3-OCH₃—C₆H₄— | H | H | ...do... | —CH₂CH₃ | —CH₃ | Do. |
| 21 | CH₃O—C₆H₄— | H | H | ...do... | —CH₂CH₂CH₂CH₃ | —CH₃ | Do. |
| 22 | naphthyl | H | H | ...do... | —CH₂CH₃ | —CH₃ | Do. |
| 23 | ...do... | H | H | ...do... | —CH₂CH₂Cl | —CH₃ | Do. |
| 24 | Same as above | H | H | ...do... | —CH₂CH₂COOCH₃ | —CH₃ | Do. |
| 25 | ...do... | H | H | CH₃O—C₆H₄— | —CH₂CH₃ | —CH₃ | Do. |
| 26 | ...do... | H | H | C₆H₅— | —CH₂CH₂—OC₂H₅ | —CH₃ | Do. |
| 27 | ...do... | H | H | Same as above | —C₂H₄CN | —CH₃ | Do. |
| 28 | ...do... | H | H | ...do... | —CH(CH₃)₂ | —CH₃ | Do. |

[1] On polyethylene glycol terephthalate fibres.

Dyeing instructions (a) 1.0 g. of the styryl dyestuff obtained according to Example 1 is ground with 2 g. of a ligninsulphonate in an aqueous suspension, and dried. 2.0 g. of the resulting powder are then finely dispersed in 2,500 g. of water in a pressure dyeing apparatus. 5 g. of ammonium sulphate and 0.2 g. of formic acid are added to this dispersion. 100 g. of polyethylene glycol terephthalate fabric are now introduced into the dyeing liquor at 70° C., the bath is heated to 130° C. over the course of 30 minutes, and dyeing is carried out for one hour at this temperature. The pH value of the dyebath is 3–4. The dyeing is subsequently rinsed with water and dried. A brilliant, greenish-tinged yellow dyeing is obtained which has excellent fastness to light, washing and sublimation.

The dyestuffs described in the other examples give dyeings of equivalent quality by this process.

(b) Polyethylene glycol terephthalate fabric is impregnated on a padder, at 40° C., with a liquor of the following composition: 20 g. of the dyestuff obtained according to Example 2, finely dispersed in 7.5 g. of sodium alginate, 20 g. of triethanolamine, 20 g. of octylphenol polyglycol ether and 900 g. of water.

The fabric is squeezed out to approx. 100%, dried at 100° C. and subsequently set for 30 seconds at a temperature of 210° C. The dyed goods are rinsed with water, soaped and dried. Under these conditions a greenish-tinged yellow dyeing which is fast to washing, rubbing, light and sublimation is obtained.

The dyestuffs described in the other examples yield dyeings of equivalent quality by this process.

(c) 1 g. of the dyestuff obtained according to Example 1 is dispersed in 5,000 g. of water. To this dispersion are added 25 g. of the sodium salt of 1-phenyl-phenol as a swelling agent, and 2.5 g. of ammonium sulphate, and 100 g. of yarn of polyethylene glycol terephthalate are dyed for 1½ hours at 95–98° C. The dyeing is rinsed and dried. It is then further set for one minute at 190° C.

A greenish-tinged yellow dyeing which is fast to washing, light and sublimation is thus obtained.

If, in the above example, the 100 g. of polyethylene glycol terephthalate yarn are replaced by 100 g. of cellulose triacetate fabric, dyeing is carried out under the conditions indicated, and the fabric is subsequently rinsed with water, a greenish-tinged yellow dyeing of good fastness to washing and sublimation is obtained.

What we claim is:

1. A mixture of two styryl dyestuffs which are sparingly soluble in water and are free of groups which dissociate in water to give an acid reaction and confer solubility in water, of the formula

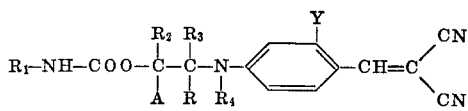

wherein one of A and B represents hydrogen and the other represents phenyl or phenyl substituted by lower alkyl, lower alkoxy or halogen, $R_1$ represents alkyl of 1–8 carbon atoms, cycloalkyl of 5–6 carbon atoms, naphthyl, biphenyl, phenyl, phenyl substituted by nitro, cyano, lower alkyl, lower alkoxy or halogen, or a residue of the formula

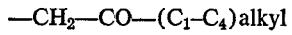

$R_2$ and $R_3$ independently of one another represent hydrogen or methyl, $R_4$ represents lower alkyl or lower alkyl substituted by halogen, lower alkoxy or lower alkoxycarbonyl, and Y represents hydrogen, halogen or lower alkyl, the dyestuff components of the mixture being isomers of each other.

2. A mixture of two styryl dyestuffs of the Formula I according to claim 1, in which $R_1$ denotes the phenyl group and $R_2$ and $R_3$ denote hydrogen.

3. A mixture of two styryl dyestuffs as claimed in claim 1 of the formulae

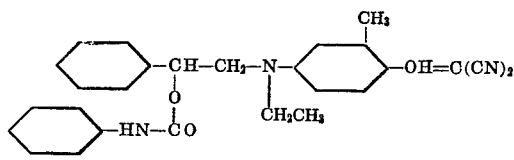

and

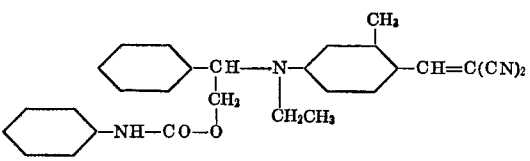

References Cited
UNITED STATES PATENTS 2,850,520  9/1958  Merian et al. _____ 260—465
3,555,016  1/1971  Peter et al. _____ 260—465 X LEWIS GOTTS, Primary Examiner D. H. TORRENCE, Assistant Examiner U.S. Cl. X.R.

8—179; 260—294.9, 315, 332.2 A, 345.8, 347.4, 468 C, 471 C, 482 C